United States Patent [19]

Bartolini et al.

[11] 3,926,637

[45] Dec. 16, 1975

[54] PERMANENT ORGANIC VOLUME PHASE HOLOGRAPHIC RECORDING MEDIUM

[75] Inventors: Robert Alfred Bartolini, Trenton; Allen Bloom, East Windsor, both of N.J.

[73] Assignee: RCA Corporation, New York, N.Y.

[22] Filed: Oct. 4, 1973

[21] Appl. No.: 403,408

[52] U.S. Cl................. 96/115 R; 96/27 H; 96/27 R; 96/67; 350/3.5; 204/159.16

[51] Int. Cl.$^2$... G03C 1/76; G03C 3/00; G03C 5/04

[58] Field of Search......... 96/27 H, 67, 35.1, 115 R; 350/3.5; 204/159.16

[56] References Cited

UNITED STATES PATENTS

| | | | |
|---|---|---|---|
| 3,547,509 | 12/1970 | Brandes | 350/3.5 |
| 3,580,657 | 5/1971 | Sheridon | 96/27 H |
| 3,658,526 | 4/1972 | Haugh | 96/27 H |
| 3,707,371 | 12/1972 | Files | 96/27 H |
| 3,764,333 | 10/1973 | Leclair et al. | 96/67 |
| 3,809,686 | 5/1974 | Chandross et al. | 96/27 H |

*Primary Examiner*—Charles L. Bowers, Jr.
*Assistant Examiner*—Edward C. Kimlin
*Attorney, Agent, or Firm*—Glenn H. Bruestle; Birgit E. Morris

[57] ABSTRACT

Holographic recording media which form permanent holograms are prepared from α-diketones which are capable of intermolecular hydrogen atom abstraction dissolved in a transparent, cured acrylic polyester host.

5 Claims, 1 Drawing Figure

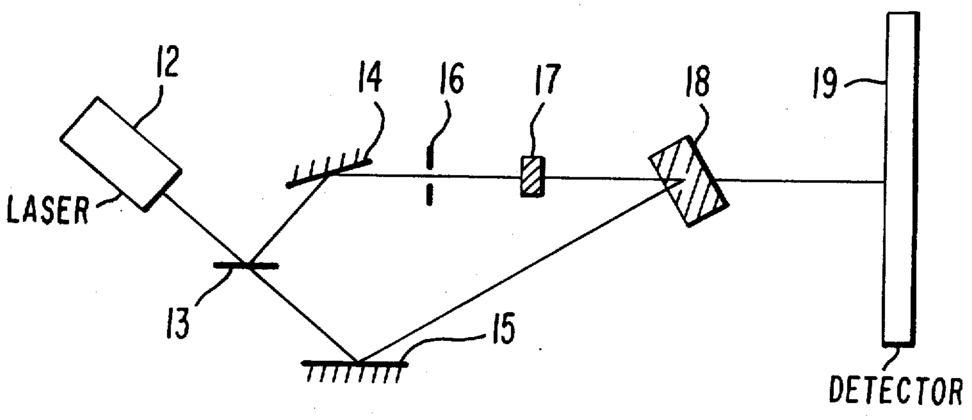
12
LASER
13
14
15
16
17
18
19
DETECTOR

PERMANENT ORGANIC VOLUME PHASE HOLOGRAPHIC RECORDING MEDIUM

This invention relates to novel holographic recording media. More particularly, this invention relates to holographic recording media in which permanent phase holograms can be recorded and which comprise α-diketones which are capable of intermolecular hydrogen atom abstraction dissolved in a cured polymeric host.

CROSS REFERENCE TO RELATED APPLICATIONS

This application discloses subject matter which is related to that disclosed in a copending application of D. L. Ross entitled "Organic Volume Phase Holographic Recording Media," Ser. No. 403,377 filed Oct. 4, 1973.

BACKGROUND OF THE INVENTION

The copending application of D. L. Ross described above and incorporated by reference herein describes holographic recording media including certain α-diketones dissolved in polymeric precursors which are curable to form transparent polymers. Holographic information is recorded with modulated coherent light by changing the index of refraction in the recording media. The useful α-diketones have absorption band wavelength tails corresponding to the wavelengths used for recording. This makes it possible to use fairly high concentrations of the α-diketones while the optical density of the media remains low at the recording wavelength. While some of these materials can form holograms of a permanent nature in the recording media, the readout or detector light beams have to have a light intensity below a certain threshold level which is below that used for recording. Light of an intensity above that level erases the holographic information. This phenomenon limits the recording and readout systems which can be employed with these media and reduces the contrast of the hologram obtained during readout.

SUMMARY OF THE INVENTION

We have found that certain α-diketones, viz, those which are capable of intermolecular hydrogen atom abstraction, can be dissolved in certain polymeric precursors of the acrylic polyester type which are then cured to form holographic recording media. High efficiency holograms can be stored permanently, i.e., fixed therein, and can be read out with readout or detector light of the same intensity as that used for recording.

BRIEF DESCRIPTION OF THE DRAWINGS

The FIGURE is a schematic diagram of an apparatus suitable for recording volume phase holograms.

DETAILED DESCRIPTION OF THE INVENTION

Although the mechanism of holographic recording and self-fixing in the recording media described herein is not fully known or understood, the photochemical reaction that occurs during recording, which changes the index of refraction in the recording medium, must depend on some form of hydrogen atom abstraction— either between the α-diketone molecules, or by reaction between the α-diketone and the host polymer. The reaction between the reactive α-diketone and the host polymer is irreversible and results in a permanent hologram which can be read out with light of the same intensity employed for recording. Such holograms are of very high efficiency as well.

The α-diketones capable of intermolecular hydrogen atom abstraction having the formula $$(R-\overset{\overset{O}{\|}}{C}-\overset{\overset{O}{\|}}{C})_x R'$$

wherein R and R' independently can be methyl, a branched chain alkyl group or a cyclic hydrocarbon group wherein the carbon atoms are part of an aromatic or aliphatic ring or R and R' together can form part of an aromatic or aliphatic ring; and $x$ is either 1 or 2. Illustrative of suitable α-diketones are benzil, 1,3-or 1,4-bis(phenylglyoxalyl) benzene, camphorquinone, 2,3-butanedione, 1-phenyl-1,2-propanedione and the like.

The polymeric host must be capable of dissolving the α-diketone in its uncured and cured states, must be transparent when cured and must be able to give up hydrogen atoms to the α-diketone during recording of the hologram. In addition, the polymer precursor should be able to be polymerized rapidly to give strain free polymers at relatively low temperatures utilizing initiators, when required, which are inert with respect to the αdiketone employed. Free radical polymerizable acrylic polyesters are suitable. In particular, Castolite Liquid Casting Plastic AP resin commercially available from The Castolite Company can be employed.

The choice of α-diketone, host polymer and concentration of α-diketone in the host polymer depends upon several factors; the wavelength of light the host is designed for; the solubility of the α-diketone in the uncured host material; the molecular weight of the α-diketone; the absorption spectrum of the α-diketone in the wavelength region used during recording and readout; and the thickness of the recording medium. The α-diketone will be chosen so that its absorption band wavelength tail is close to the recording wavelength, or, that it will have low optical density at that wavelength, e.g., less than about 0.2. This allows high concentrations of the α-diketone to be employed with little or no loss in efficiency. Amounts of about 1 to about 25%, preferably about 2.5 to about 10%, by weight of the α-diketone in the host polymer can be used. As an illustration of the above, for thick samples of about 1 centimeter, 5% of camphorquinone in Castolite can be employed at 5,145 Angstroms wavelength but not at 4,880 Angstroms. However, in thinner sections, about 1 millimeter thick, the 4,880 Angstrom wavelength would be satisfactory for this system.

The recording media as hereinabove described are thus prepared simply by dissolving the α-diketone in the uncured polymer precursor and curing the solution to form clear solid castings of the shape and thickness desired. Alternatively, thick castings can be cut and polished after casting to obtain the desired shape and thickness.

The FIGURE is a schematic diagram of a system useful for recording and readout of holographic information in the recording media described above. Referring now to the FIG., the system includes a laser 12 which emits a coherent light beam. The light beam passes through a beam splitter 13. A portion of the beam is reflected from the beam splitter 13 onto a first mirror 14; the remainder of the light beam passes through onto a second mirror 15. The mirrors 14 and 15 are adjusted so that the plane polarized beams reflected from them meet at a predetermined angle, such as 30°–45°. The portion of the beam reflected from the beam splitter 13 is the object beam. The object beam passes through a shutter 16 and then through the object to be recorded 17. The portion of the beam which passes through the beam splitter 13 is the reference beam. The recording medium 18 is positioned at the intersection of the reference and object beams. During readout, the shutter 16 is closed and only the reference beam passes through to the recording medium. The image can be viewed on a detector screen 19.

When more than one image is to be recorded in the recording medium, means for rotating or otherwise changing the selected portion of the recording medium exposed to the light beams is provided. During readout, means to rotate the recording medium or means to change the position or angle of the reference beam at the required angle of incidence will also be provided.

The invention will be further illustrated by the following examples, but it is to be understood that the invention is not meant to be limited to the details described therein.

EXAMPLE 1

One gram of benzil was admixed with 20 grams of Castolite resin. Seven drops of Castolite hardener were added, the mixture stirred and placed in a vacuum dissicator for several minutes to remove any gas bubbles. The solution was poured into several 1 centimeter (hereinafter cm) thick molds and allowed to cure at room temperature for five days.

After removal from the molds, the castings were clear and hard and of a light yellow color.

A sample 1 cm cube was cut and polished. Holograms were recorded in an apparatus according to the FIGURE using a laser with a wavelength of 4,880 Angstroms. Laser power of 15 J/cm² produced a 20% efficient hologram that was self fixing—i.e., after three months it did not decrease in efficiency using readout light of the same intensity as the recording light.

EXAMPLE 2

Example 1 was repeated except that camphorquinone was substituted as the α-diketone. A 30 J/cm² exposure with a laser having a wavelength of 5,145 Angstroms produced a 30% efficient hologram which was permanent.

Another sample 1 cm² × 5 mm thick was cut and polished. 80 holograms were recorded in this sample by turning the crystal 1/10°for each new recording. The exposure was 10 J/cm² and efficiency of the holograms were from 1–2%. Multiple recordings had no effect on the efficiency of previously recorded holograms, and no degradation of the recording medium was observed after the multiple recording.

EXAMPLES 3–6

Additional samples were prepared following the general procedure of Example 1 but different α-diketones were substituted. Preparation of the recording media and data relating to holographic recording are summarized below:

| Example | α-diketone | Concentration, % | Input Power, J/cm² | Efficiency, % |
|---|---|---|---|---|
| 3 | 2,3-butanedione | 5 | 20 | 15 |
| 4 | 1,4-bis(phenyl-glyoxalyl)benzene | 2.5 | 20 | 20 |
| 5 | 1,3-bis(phenyl-glyoxalyl)benzene | 2.5 | 20 | 20 |
| 6 | 1-phenyl-1,2-propanedione* | 5 | 20 | 23 |

*decayed in 4–6 weeks

We claim:

1. A medium for recording permanent volume phase holograms consisting essentially of a cured, transparent acrylic polyester polymer containing an α-diketone which is soluble in said polyester and is capable of intermolecular hydrogen atom abstraction with said polyester and which has the formula $$(R-\overset{O}{\overset{\|}{C}}-\overset{O}{\overset{\|}{C}})_xR'$$

wherein R and R' independently are selected from the group consisting of methyl, branched chain alkyl and cyclic hydrocarbon groups wherein the carbon atoms are part of an aromatic or aliphatic ring and R and R' together can form part of an aromatic or aliphatic ring; and $x$ is 2; said α-diketone being present in an amount sufficient to cause a permanent change in the index of refraction of said medium when illuminated by a spatially modulated coherent light beam having a wavelength corresponding to the absorption band wavelength tail of said α-diketone.

2. A holographic recording medium according to claim 1 wherein the α-diketone is 1,4-bis(phenylglyoxalyl)-benzene.

3. A holographic recording medium according to claim 1 wherein the α-diketone is 1,3-bis(phenylglyoxalyl)-benzene.

4. A holographic recording medium according to claim 1 wherein from about 1 to about 25% by weight of the α-diketon is present based on the weight of said polyester.

5. A holographic recording medium according to claim 1 wherein from about 2.5 to about 10% by weight of the α-diketon is present based on the weight of said polyester.

* * * * *